Figure 3:
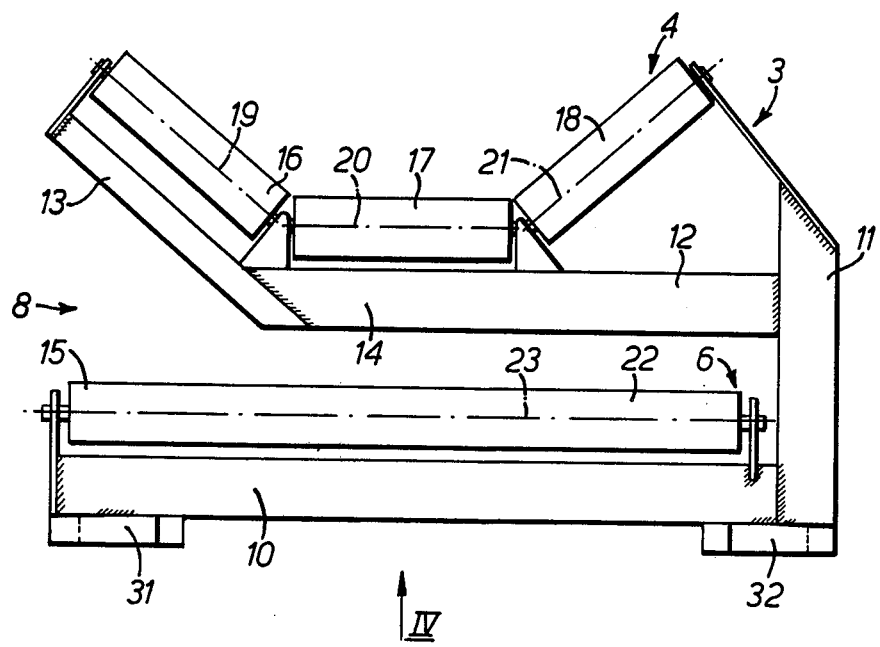

United States Patent [19]

Butcher et al.

[11] 4,245,738

[45] Jan. 20, 1981

[54] BELT CONVEYORS AND BELT SUPPORTING STOOLS THEREFOR

[75] Inventors: Michael J. A. Butcher; Stewart D. Jelfs, both of Worcester, England

[73] Assignee: Dowty Meco Limited, Worcester, England

[21] Appl. No.: 27,474

[22] Filed: Apr. 5, 1979

[30] Foreign Application Priority Data

Apr. 15, 1978 [GB] United Kingdom ............... 14898/78

[51] Int. Cl.³ ...................... B65G 21/14; B65G 15/08
[52] U.S. Cl. .................................... 198/812; 198/829
[58] Field of Search .............. 198/804, 812, 823, 824, 198/825, 828, 829, 830, 860, 560, 562, 594, 862; 193/35 TE

[56] References Cited

U.S. PATENT DOCUMENTS

| 2,514,715 | 7/1950 | Milik | 198/830 |
|---|---|---|---|
| 2,822,913 | 2/1958 | Craggs et al. | 198/812 |
| 2,846,050 | 8/1958 | Craggs et al. | 198/812 |
| 2,858,933 | 11/1958 | Hardy | 198/812 |
| 2,986,266 | 5/1961 | Moon | 198/812 |
| 3,128,869 | 4/1964 | Hardy | 198/594 X |
| 3,876,060 | 4/1975 | Stease | 193/35 TE X |

Primary Examiner—James L. Rowland
Attorney, Agent, or Firm—Young & Thompson

[57] ABSTRACT

A belt conveyor of the extendible type wherein stools are provided which complete with respective upper and lower belt supporting elements can readily and reliably be introduced into the extendible portion of the conveyor during operation of the conveyor. Each such stool is provided with a gap at one side thereof and between its upper and lower elements to enable it to be inserted into the run of the conveyor in a direction transversely thereof. When so inserted the stool is disposed with its upper element above the lower run of the belt and with its lower element below the lower run of the belt.

18 Claims, 4 Drawing Figures

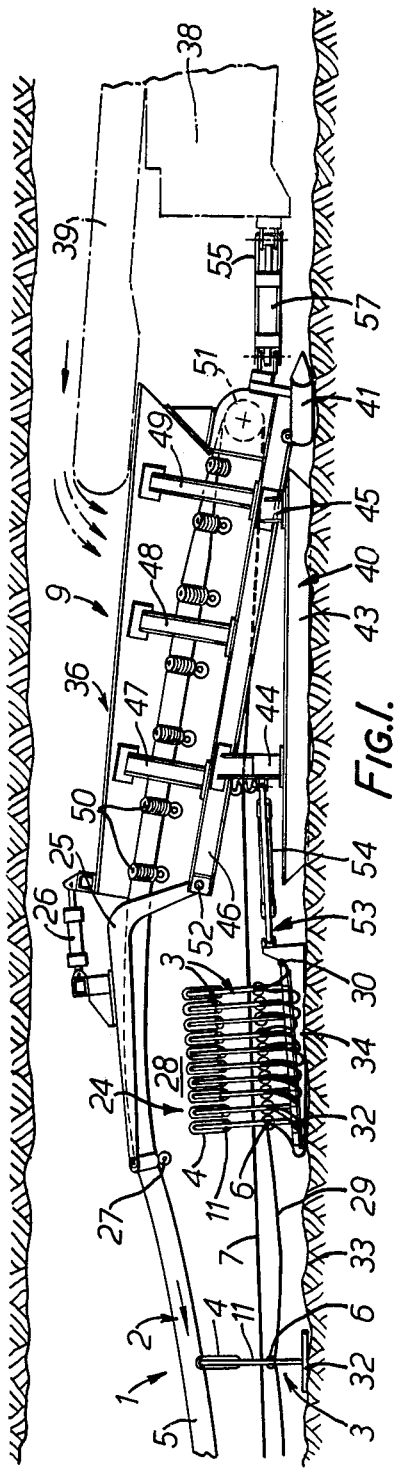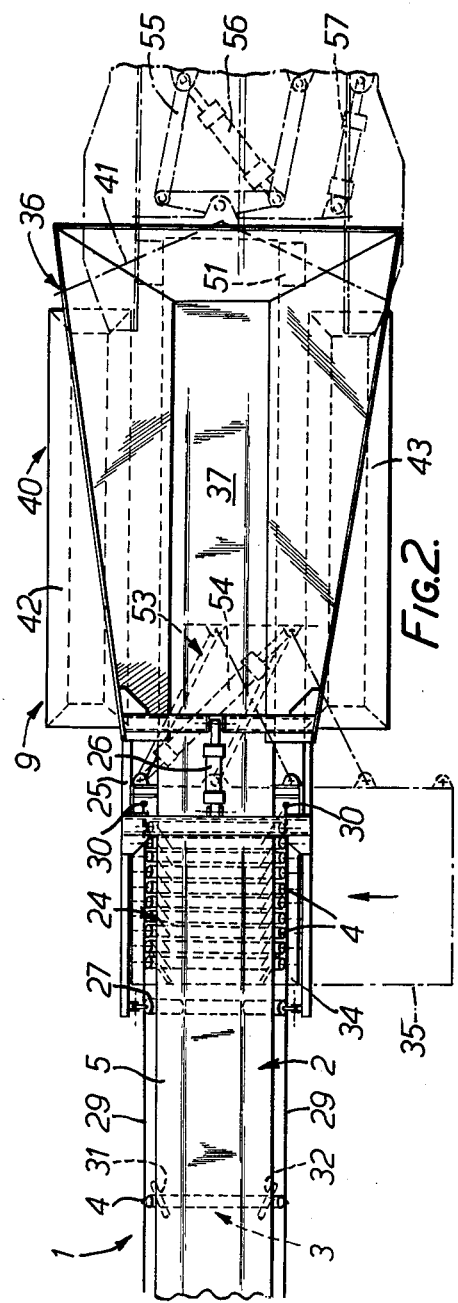

BELT CONVEYORS AND BELT SUPPORTING STOOLS THEREFOR

This invention relates to belt conveyors and to belt-supporting stools therefor.

A belt conveyor usually includes an endless belt, a series of devices known as "stools" which are required to be spaced apart one from another lengthwise of the conveyor, a plurality of upper elements, for example rollers or sets of rollers, over which the upper or conveying run of the belt will pass in use, and a plurality of lower elements, also for example rollers or sets of rollers, over which the lower or return run of the belt will pass in use.

Certain belt conveyors are so constructed that they are permitted to extend in length, each upon movement for example of a respective machine, which is connected to one end portion of the conveyor and which is intended to cut mineral or other material as it proceeds in its movement. The material so cut can be discharged by the machine directly onto the extending end portion of the conveyor and be transported by the conveyor to a position for bulk collection at the opposite end portion of the conveyor.

With such extendible conveyors, it is necessary for stools, each carrying upper and lower belt supporting elements, to be introduced to the conveyors at their end portions where extension is to be effected to provide adequate support for the material being discharged thereupon. It is desirable for such stools, together with their elements, to be introduced to the conveyors while they are running, that is actually operating.

However, hitherto difficulty has been experienced in providing belt conveyors in which such introduction of stools together with their said upper and lower elements during conveyor operation can readily and reliably be effected.

The invention as claimed is intended to provide a remedy. It solves the problem of how to design a belt conveyor in which, during operation, at least one stool together with its said upper and lower elements can be so introduced readily and reliably to the extendible portion thereof.

According to this invention a belt conveyor, which is extendible in length, includes an endless belt, a plurality of stools arranged to be spaced apart one from another lengthwise of the conveyor, a plurality of upper elements over which the upper run of the belt will pass in use, and a plurality of lower elements over which the lower run of the belt will pass in use, one or more of said stools each carrying respective said upper and lower elements and being provided with a gap at one side thereof and between said elements to enable it to be inserted, during operation of the conveyor into the run of the conveyor in a direction transversely thereof, for support of the belt at that end portion of the conveyor at which extension is to be effected, and said stool when so inserted being disposed with its said upper element above the lower run of the belt and with its said lower element below the lower run of the belt.

The said gap may be a permanent gap, or alternatively may be a gap which is closed in suitable manner following insertion of the stool into the run of the conveyor.

Also according to the invention a stool, which is suitable for insertion into the extendible portion of a belt conveyor of extendible type when the conveyor is operating, carries an upper element, over which the upper run of the endless belt of the conveyor will pass in use, and a lower element, over which the lower run of the belt will pass in use, said stool being provided with a gap at one side thereof and between said elements to enable it to be inserted into the run of the conveyor in a direction transversely thereof with its said upper element above the lower run of the belt and its said lower element below the lower run of the belt.

The advantages offered by the invention are mainly that such insertion of the or each said stool, together with its said upper element and its said lower element, into the conveyor, can be effected when the conveyor is actually running with the upper, conveying, run of the endless belt loaded with material, without impeding the satisfactory operation of the conveyor.

Figure 4:
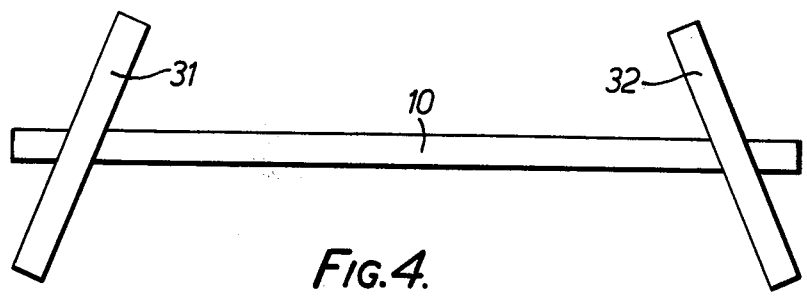

One way of carrying out the invention is described in detail below with reference to drawings which illustrate only one specific embodiment, in which:

FIG. 1 is a side elevation of a part of an endless belt conveyor of extendible type, FIG. 2 is a plan view of FIG. 1, FIG. 3 is a front elevation of a stool such as used in the construction shown in FIGS. 1 and 2, and, FIG. 4 is a view of the base member of the stool shown in FIG. 3 taken in the direction of the arrow IV thereon.

The figures show a belt conveyor 1, which is extendible in length, including an endless belt 2, a plurality of stools 3 arranged to be spaced apart one from another lengthwise of the conveyor, a plurality of upper elements 4 over which the upper run 5 of the belt 2 will pass in use, and a plurality of lower elements 6 over which the lower run 7 of the belt will pass in use.

In accordance with the invention one or more of said stools 3 each carries respective said upper and lower elements 4, 6 and is provided with a gap 8 at one side thereof and between said elements to enable it to be inserted, during operation of the conveyor, into the run of the conveyor in a direction transversely thereof, for support of the belt 2 at that end portion 9 of the conveyor at which extension is to be effected, and said stool 3, when so inserted, being disposed with its said upper element 4 above the lower run 7 of the belt and with its said lower element 6 below the lower run of the belt.

In accordance with the preferred embodiment of the invention shown in the drawings the gap 8 is a permanent gap and those stools 3 so provided are each formed with a base member 10, which carries the respective lower element 6, and with a leg 11 at the other side of the stool which is rigidly mounted, for example by welding, at right-angles upon the base member. A support member 12, which carries the respective upper element 4, is welded to the leg 11 and extends rigidly therefrom in cantilever manner. At its end portion 13 the member 12 is inclined with respect to the main portion 14 as shown in FIG. 3.

The permanent gap 8 is bounded by the end portion 15 of the lower element 6 and the extremity of the end portion 13 both remote from the leg 11 as also shown in FIG. 3.

Each of the upper elements 4 of the conveyor comprises a set of rollers, which includes three rollers 16, 17 and 18. Preferably the belt 2 is of rubber or other suitable flexible material. The relative disposition of the rotational axes 19, 20 and 21 of the rollers 16, 17 and 18 is such that the upper run 5 of the belt 2 passing over these rollers assumes a cross-sectional shape of trough-like form.

Each of the lower elements 6 of the conveyor comprises a single roller 22, the rotational axis 23 of which is parallel to the rotational axis 20 of the roller 17.

Each member 10, leg 11 and member 12 together afford the respective stool an inherently rigid basic construction for support of its elements 4, 6.

Since FIGS. 1 and 2 only show the right-hand end portion 9, that is the end portion of the conveyor at which extension can be effected, a large number of stools and rollers of the conveyor are not shown. However, certain of these stools may be of similar form to those shown in the drawings while others may be of different form and may be connected to "stringers" which space them apart. Further, all of the rollers not shown may be carried by respective stools, or, some of the rollers not shown may be carried by respective stools and some by "stringers", or, all of those not shown may be carried only by "stringers", as is convenient in the particular conveyor structure. The conveyor is also provided with means (not shown) for the storage of a predetermined length of the belt 2 and for paying out appropriate amounts of this length as required to permit the necessary extension in length of the conveyor.

The stools 3 shown in the drawings are so shaped that prior to insertion into the run of the conveyor they can be disposed closely adjacent each other in nested relation as a batch 24 enabling them to be inserted in their nested relation. A belt-lifting frame 25 operable by a jack 26 and carrying a set 27 of upper rollers is provided as shown to so hold the upper run 5 of the belt as to give adequate clearance, as at 28 in FIG. 1, for insertion of the batch 24 into the run of the conveyor.

It is intended that as the conveyor is increased in length the stools 3 of the batch 24 are caused, by the length-increasing movement, and one by one, to move away from their nested relation and to take up appropriate positions along the run of the conveyor.

Linking means, in the form of a pair of cables 29, are provided which connect all the stools 3 of the batch 24 in the manner shown in FIG. 1, and are so anchored at their right-hand ends at 30 as to ensure that the stools of the batch are correctly placed and held in their appropriate positions along the run of the conveyor.

Each of the stools 3 of the batch is provided with feet 31, 32 which are set at such an angle to the base member 10 as to facilitate the nesting together of these stools and which, with the cable 29, ensure that each stool stands substantially upright on the floor 33 of the mine when in its appropriate position after being caused to move away from its nested relation.

A first sledge 34 is provided for support of the batch 24 of stools 3. As well as being slidable along the floor 33 lengthwise of the conveyor this sledge is movable together with the batch, transversely of the run of the conveyor, that is in a direction substantially at right-angles thereto, from a first position as shown in broken lines at 35 in FIG. 2 alongside the lower run 7 of the belt 2 to a second position in which the stools of the batch are all inserted into the run of the conveyor with their upper elements 4 disposed above the lower run 7 and their lower elements 6 disposed below the lower run.

A hopper 36, which has a base slot 37, is provided in association with the extendible end portion 9 of the conveyor and is so shaped and positioned as directly to receive material cut by a mineral-cutting machine 38 itself provided with a small belt unit 39. The hopper 36 is carried by a second sledge 40 which, at its forward end portion, is provided with a V-shaped plough 41 intended to clear the floor 33 of loose material and debris prior to the laying of the stools 3 of the batch 24 upon the floor during conveyor extension.

The sledge 40 comprises two slider elements 42, 43 which together support structural elements 44, 45, 46, 47, 48 and 49 for mounting the hopper 36. Seven sets 50 of upper rollers are arranged in association with the base of the hopper, and the slot 37 placed above the middle of the upper run 5 of the belt. The sets 50 each comprise three rollers which, like the rollers 16, 17 and 18, are so relatively disposed as to cause the upper run 5 of the belt 2 to assume the cross-sectional shape of trough-like form. The sets 50 are suitably supported by the hopper. The main right-hand conveyor roller is shown in broken lines at 51. The forward end of the structural element 46 pivotally supports the frame 25 at 52.

The first sledge 34, the second sledge 40 and the machine 38 are connected together so that as the machine proceeds in its cutting operation the sledges are towed thereby and the conveyor thus extended in length, the means (not shown) which stores a length of the belt 2 permitting the paying out of the belt by an appropriate amount as such extending movement occurs, whilst maintaining desired tension in the belt.

The transverse movement of the sledge 34 away from and back to its first position is effected by means which comprises a parallelogram linkage 53 and a jack 54 diagonally disposed in that linkage. This linkage and its jack are connected between the sledge 34 and the elements 44 of the sledge 40 as shown in FIGS. 1 and 2.

A further parallelogram linkage 55 with a jack 56 diagonally disposed in that linkage, and also a further jack 57, are provided between the machine 38 and the sledge 40 to afford a degree of steerability which ensures that the conveyor can be maintained in the required substantially straight-line relationship.

During operation of the conveyor and with the machine 38 cutting mineral material and depositing this onto its belt unit 39, the material is discharged into the hopper 36 and through the slot 37 onto the upper run 5 of the belt 2, the portion of the belt beneath the slot and its load being adequately supported by the sets 50 of upper rollers. As the machine 38 proceeds to the right in FIG. 1 in its cutting operation and thus commences to effect extension of the conveyor, the jack 54 is operated to move the sledge 34 and its batch 24 of stools 3 into the run of the conveyor. As conveyor lengthening progresses, stools 3 leave their nested relation one after the other and are appropriately positioned, as determined by the lengths of cable 29 between them, along the run of the conveyor, thereby supporting the upper and lower runs 5 and 7 of the belt 2. When all the stools of a batch are so positioned, the cables 29 are released from their anchorages 30. The jack 54 is then operated to move the sledge 34 transversely outwardly from the conveyor whereupon a further batch of stools is placed on the sledge, and cables 29 associated with that batch connected to the previous batch and to the anchorages 30. The jack 54 is then operated to move the sledge and its further batch into the conveyor run and as thereafter the machine 38 moves further to the right and conveyor extension proceeds, the stools of the further batch are appropriately positioned along the run of the conveyor.

The introduction of the batches 24 of stools 3 may be effected under manual control or, alternatively, can be effected automatically.

Although in the embodiment above-described with reference to the drawings the batches 24 are mounted upon a sledge, in other embodiments they may be carried on a vehicle which is separate from the conveyor and which moves alongside the conveyor at the same speed.

Although in the embodiment above-described with reference to the drawings the stools so introduced into the conveyor are spaced by a pair of cables 29, in other embodiments more than two such cables may be used which, in certain installations, may prove desirable for ensuring uprightness of the stools so positioned along the run of the conveyor.

Although in the embodiment above-described with reference to the drawings stools are introduced into the conveyor as a batch, in other embodiments stools may be introduced individually one after another by an appropriate mechanism which may be either manually controlled, or, alternatively automatically controlled.

Again, although in the embodiment above-described with reference to the drawings each stool introduced into the conveyor at its extendible end portion is formed with a permanent gap at one side thereof and with a leg at the other side thereof, in other embodiments each such stool may have a leg at both sides thereof, and the leg at said one side be so formed that it can provide a temporary gap. In this case that leg may be formed in two parts, one of which is associated with the upper belt-supporting element and the other of which is associated with the lower belt-supporting element, a gap formed between the two parts being closed by suitable means after insertion of the stool into the run of the conveyor.

Further, where the said leg at one side of the stool is in two parts, those two parts may normally co-operate one with the other (that is to say, they are effectively continuous) and may be separable, the one from the other, by effectively hinging about the other leg, to provide the temporary gap for insertion of the stool into the run of the conveyor.

Where each stool has a leg at both sides thereof cross-members may be provided between the legs, and each upper belt-supporting element and each lower belt-supporting element may be supported by a cross-member.

When the two parts of a separable leg are not separated they may be afforded rigidity, if not sufficiently rigid, by a reinforcing member.

Finally, the said leg at said one side of the stool may be formed as one part which is hingeable with respect to the remainder of the stool to provide the temporary gap or may include within it a telescoping element capable of closing the temporary gap after insertion of the stool into the conveyor run.

We claim:

1. A belt conveyor, which is extendible in length, including an endless belt, a plurality of stools arranged to be spaced apart one from another lengthwise of the conveyor, a plurality of upper elements over which the upper run of the belt will pass in use, and a plurality of lower elements over which the lower run of the belt will pass in use, one or more of said stools being of inherently rigid basic construction, including respective said upper and lower elements and being provided with a gap at one side thereof and between said elements to enable it to be inserted, during operation of the conveyor, into the run of the conveyor in a direction substantially at right-angles thereto, in an upright attitude and wholly from one side or alternatively wholly from the other side thereof as a complete unit for support of the belt at that end portion of the conveyor at which extension is to be effected, and said stool when so inserted being disposed with its said upper element above the lower run of the belt and with its said lower element below the lower run of the belt.

2. A conveyor as claimed in claim 1, wherein the said gap is a permanent gap.

3. A conveyor as claimed in claim 2, wherein the or each said stool provided with a permanent gap is formed with a base member, which carries the respective said lower element, and with a leg at the other side of the stool which is mounted on the base member and from which a support member which carries the respective said upper element extends in cantilever manner.

4. A conveyor as claimed in claim 3, wherein said permanent gap is bounded by that end of said support member and that end of the respective said lower element both remote from said leg.

5. A conveyor as claimed in claim 1, wherein each of said upper elements comprises a set of rollers.

6. A conveyor as claimed in claim 5, wherein each said set includes three rollers and the relative disposition of the rotational axes of these rollers is such that said belt when passing over the rollers assumes a cross-sectional shape of trough-like form.

7. A conveyor as claimed in claim 1, wherein each of said lower elements comprises a single roller.

8. A conveyor as claimed in claim 1, wherein where a number of said stools intended for insertion in a direction transversely into the run of the conveyor are provided, they are so shaped that prior to insertion they can be disposed closely adjacent each other in nested relation as a batch enabling them to be inserted into the run of the conveyor in their nested relation.

9. A conveyor as claimed in claim 8, wherein as said conveyor thereafter increases in length said stools of said batch are caused, by the length-increasing movement and one by one, to move away from their nested relation and to take up appropriate positions along the run of the conveyor.

10. A conveyor as claimed in claim 9, wherein linking means are provided which so connect the stools of said batch together as to ensure that the stools are correctly placed and held in their said appropriate positions along the run of the conveyor.

11. A conveyor as claimed in claim 9, wherein each of said stools of said batch is provided with feet which are set at such an angle to the main part of the stool as to facilitate the nesting together of those stools, and which at least assist in ensuring that each stool stands substantially upright when in its appropriate position after being caused to move away from its nested relation.

12. A belt conveyor, which is extendible in length, including an endless belt, a plurality of stools arranged to be spaced apart one from another lengthwise of the conveyor, a plurality of upper elements over which the upper run of the belt will pass in use, and a plurality of lower elements over which the lower run of the belt will pass in use, certain of said stools, which are intended for insertion into the run of the conveyor in a direction substantially at right-angles thereto and at that end portion thereof at which extension is to be effected, each including respective said upper and lower elements, and each being provided with a gap at one side thereof and between said elements to facilitate such insertion, and these stools being so shaped that prior to insertion they can be disposed closely adjacent each other in nested relation as a batch enabling them to be inserted into the run of the conveyor in their nested relation so that as said conveyor thereafter increases in length, said stools of said batch are caused by the length-increasing movement, and one-by-one, to move away from their nested relation and to take up appropriate positions along the run of the conveyor, a first sledge slidable lengthwise of the conveyor being provided for support of said batch and means also being provided for moving said sledge together with said batch transversely of the run of the conveyor from a first position alongside said lower run of said belt to a second position in which said stools of said batch are together all positioned with their said upper elements disposed above said lower run of said belt and with their said lower elements disposed below said lower run.

13. A conveyor as claimed in claim 12, wherein a hopper is provided in association with the extendible end portion of said conveyor and is so positioned as directly to receive material cut by a mineral-cutting machine, said hopper being carried by a second sledge.

14. A conveyor as claimed in claim 13, wherein said first sledge, said second sledge and said machine are connected together so that as said machine proceeds in its cutting operation said sledges are towed thereby and said conveyor thus extended in length.

15. A conveyor as claimed in claim 13, wherein said means for moving said first sledge together with said batch transversely of the run of the conveyor comprises a parallelogram linkage and a jack diagonally disposed in that linkage, said linkage and jack being connected between said first sledge and said second sledge.

16. A stool, of inherently rigid basic construction and suitable for insertion into the extendible portion of a belt conveyor of extendible type when the conveyor is operating, said stool including an upper element, over which the upper run of the endless belt of the conveyor will pass in use, including a lower element, over which the lower run of the belt will pass in use, and being provided with a gap at one side thereof and between said elements to enable it to be inserted into the run of the conveyor in a direction substantially at right-angles thereto, in an upright attitude and wholly from one side or alternatively wholly from the other side thereof as a complete unit with its said upper element above the lower run of the belt and its said lower element below the lower run of the belt.

17. A stool as claimed in claim 16, wherein the or each said gap is a permanent gap.

18. A stool as claimed in claim 17, wherein a base member is provided, which carries said lower element, and, at the other side of said stool, a leg is provided which is mounted on the base member and from which a support member which carries said upper element extends in cantilever manner.

* * * * *